July 30, 1946.  J. A. HOFFMAN  2,405,036
METHOD OF AND APPARATUS FOR MAKING GLASS
PRODUCTS, SUCH AS FIBERS AND RODS
Filed Oct. 1, 1941  2 Sheets-Sheet 1

INVENTOR
JAMES A. HOFFMAN
BY
ATTORNEY

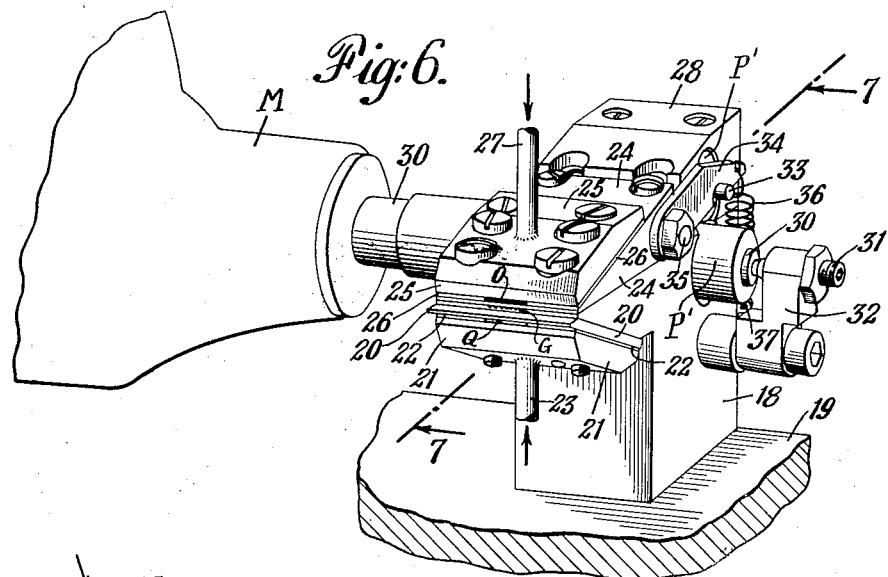
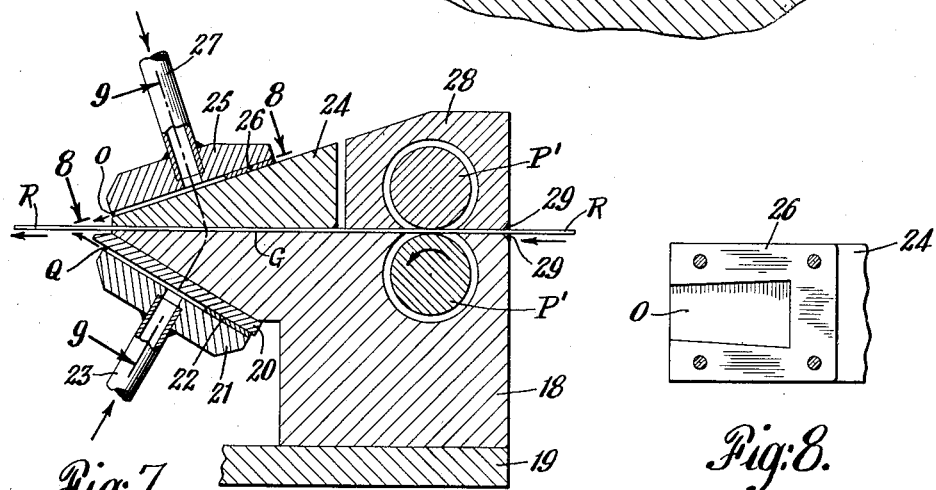
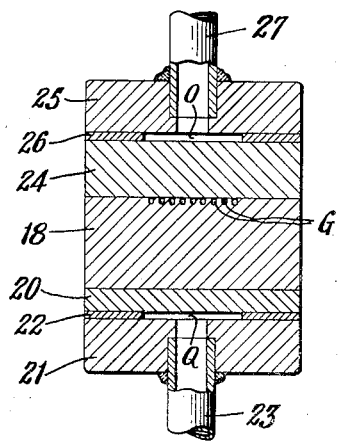
INVENTOR
JAMES A. HOFFMAN
BY
ATTORNEY

Patented July 30, 1946

2,405,036

UNITED STATES PATENT OFFICE 2,405,036

METHOD OF AND APPARATUS FOR MAKING GLASS PRODUCTS, SUCH AS FIBERS AND RODS

James A. Hoffman, Roselle, N. J., assignor to The Linde Air Products Company, a corporation of Ohio Application October 1, 1941, Serial No. 413,110

11 Claims. (Cl. 49—17)

This invention relates to the manufacture of glass products such as fibers and rods, and particularly to a method of and apparatus for making glass fibers of relatively small diameter from larger glass strips or rods, to an apparatus for making glass beads, and also to apparatus for attenuating glass rods. Glass fibers having a diameter less than 0.0002 inch, such as around 0.00012 inch, are particularly useful for making glass thread or yarn, while glass rods having a larger diameter are particularly useful for heat and electrical insulation purposes. The term "rod" is not intended to imply a short or discontinuous length.

Operations conducted in accordance with this invention produce glass fibers with a high degree of uniformity in connection with the production rate and economy of manufacture. Other methods of making glass fibers have been used in the past, but no other prior method combines the economy, the uniformity of production and the desirable fineness of fiber provided by this invention. In one of such prior methods, a high velocity jet of air or steam is directed against one or more streams of hot viscous glass at a slight angle thereto. The pulling action of the air or steam jet stretches, or attenuates, the glass, so that the glass is stretched out into fibers. However, the fineness of the fiber which can be produced economically is limited to diameters greater than 0.0002 inch, as attempts to produce smaller fibers have not been commercial and have resulted not only in an increase of manufacturing costs but also in a decrease of the production rate.

In another prior method, a glass rod is injected through a conventional metal spray gun, and while such method may produce relatively fine fibers, it is uneconomical in operation and the fibers have small beads or knobs indicating discontinuity from the use of excessive heat.

In still another prior method, a stream of molten glass is mechanically drawn, in a manner somewhat similar to the hot drawing from a crucible orifice in the previously mentioned processes except that the pulling is mechanically obtained from a winding reel. Uniform results can be produced by such mechanical drawing, but the production rate is low and the product is not as fine as desired.

Recently, attempts have been made to produce relatively fine glass fibers by passing fine streams of glass, from a pool of molten glass in a furnace, upwardly between a pair of parallel jets of air directed upwardly. A plurality of fine streams of molten glass are drawn upwardly from the teeth of a structure resembling an inverted rake or comb, and a burner is introduced into the furnace adjacent the point of egress of the glass, to keep the glass at that point as highly heated as possible. However, such a method is chiefly directed to the production of a coarser product in which uniformity is not required, and also does not embody the features of the present invention which provide such startling economies in operation.

In view of the failure of previous methods to produce the desired results, the results obtained by the present invention are all the more startling. Thus, among the objects of this invention are to provide a method of making relatively fine glass fiber, preferably from glass rod or coarser fiber; to provide such a method which will produce uniform and economical operation; to provide such a method by which a plurality of relatively fine glass fibers may be produced simultaneously; to provide such a method by which a heating flame and air jet may be utilized most effectively and economically; to provide apparatus adapted to carry out the above method; to provide such apparatus which will be facile in operation, easy to handle, and readily adjustable so as to obtain readily the optimum operating conditions; to provide such apparatus in which a ribbon-type flame and a ribbon-type air jet is used; to provide such apparatus by which a plurality of relatively fine glass fibers may be simultaneously produced from a plurality of glass rods having a diameter of around 0.001 to 0.005 inch; to provide such apparatus which can also be used for making glass beads; to provide such apparatus which will operate directly from a glass furnace bushing or other suitable source of small streams of molten glass; and to provide further apparatus for mechanically drawing molten streams of glass down to a suitable size to be utilized easily in certain of the foregoing apparatus for making relatively fine glass fibers. Other objects and novel features will become apparent from the detailed description which follows.

In general, the method of this invention comprises effecting movement of one or more glass rods in a predetermined direction, directing a high temperature heating flame against the rod, substantially in the direction of movement of the rod and preferably at a slight angle thereto, and also directing a stream of air or other suitable non-combustible gaseous fluid against the rod at a point closely adjacent or preferably slightly behind an edge of the flame impingement on the rod next to the incoming material. The possibility of making an air stream substantially coincident with the entire place of application of the heating flame but on the opposite side of the rod has not been illustrated and is not the preferred embodiment of this process. A single flame may heat a plurality of rods, with an air jet for each rod; or a plurality of rods may be passed between a ribbon-like heating flame and ribbon-like air jet.

The heating flame is preferably produced by a combustible mixture of oxygen and fuel gas, such as natural gas, propane or acetylene. With the normal types of glass used for making fibers to form threads, the size and movement of the rod and heating effect of the flame are preferably so correlated that short restricted and successive portions of the rod are heated to between about 2000° F. and 3000° F., i. e. to a temperature high enough for attenuation and above the devitrification point. However, any temperature is suitable provided that the glass is sufficiently plastic so that it will neck down properly and be attenuated sufficiently by the action of the high velocity gas stream without interruption to continuity of the rod. The angle between the heating flame and the glass rod is illustrated as being around 15°, although other angles may be used. Also, the angle between the glass rod and the attenuating stream—which may be air, steam or any other suitable gaseous medium—is in the embodiment illustrated shown as substantially the same as that of the heating flame. The high velocity attenuating stream is preferably discharged at a pressure considerably above atmospheric, a factor which apparently assists considerably in producing a stream which grips the glass sufficiently to cause the glass to neck down uniformly to a fiber having the desired diameter.

When a plurality of parallel glass rods are passed between a ribbon-like heating flame, impinging on the glass rods from one side, and a ribbon-like stream of high velocity air, steam, or other gaseous fluid impinging on the rods from the other side, the heating flame and stream each preferably intersects the glass rods along a line, in the plane of the rods, substantially horizontal or at a right angle to the direction of movement of the rods. Also, the axes of ribbon-like flame and jet preferably intersect the rods closely adjacent each other on opposite sides of the rods.

In addition, the rods are relatively cool up until the time the heating flame impinges thereagainst, and thus the rods may be spaced much closer together without danger of tangling or adhering to one another—a factor which accounts for a large saving in air consumption. In the production of glass fibers in accordance with this invention, the rods may be placed only 0.010 inch apart or even much closer, as compared with about ⅛ inch or more apart, as in previous apparatus.

The above method may be carried out by, and other features of this invention will be found in, the apparatus illustrated in the accompanying drawings, in which Fig. 1 is a side elevation of apparatus, constructed in accordance with this invention, for making a substantially continuous glass fiber from a glass rod or continuous strip in accordance with the method of this invention;

Fig. 6 is a perspective view of apparatus, constructed in accordance with this invention and forming a second embodiment thereof, for making a plurality of glass fibers from a plurality of glass rods;

Fig. 7 is a vertical sectional view of the apparatus of Fig. 6, taken along line 7—7 thereof but the flame and gas stream are not shown operating;

Fig. 8 is an oblique sectional view taken along line 8—8 of Fig. 7, and illustrates more clearly a gasket forming a part of the apparatus of Fig. 6;

Fig. 9 is a generally vertical sectional view taken along line 9—9 of Fig. 7, and illustrates more clearly the relationship between various passages formed in the apparatus of Fig. 6.

Apparatus for making a relatively fine glass fiber from a single glass rod or substantially continuous strip, as in Figs. 1-5, may comprise a pair of pushing rollers P for pushing a rod R through a tube T, and tubes 1 and 2 for directing a heating flame F and an air jet J against the rod R to form a fiber L.

Figure 5:
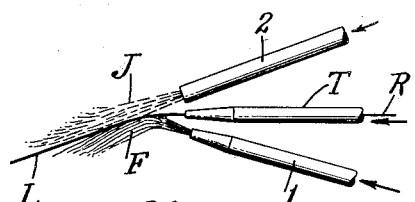
Fig. 5 is an enlarged plan view of the ends of the tubes for directing the heating flame, the air jet, and the glass rod, to illustrate more clearly the relationship of the tubes and the action of the heating flame and air jet.
Figure 3:
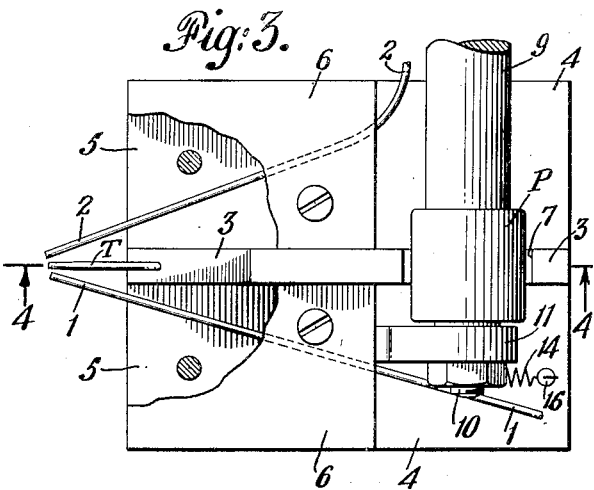
Fig. 3 is a top plan view, partly broken away, of the apparatus of Fig. 1.
Figure 2:
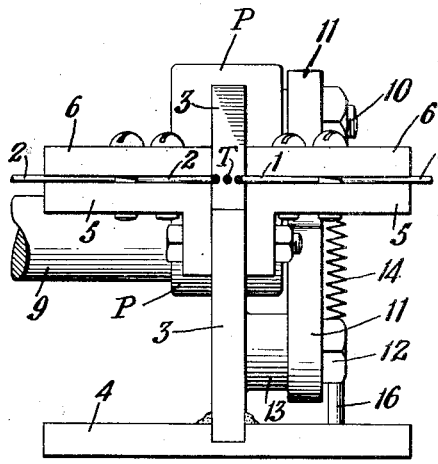
Fig. 2 is a front elevation of the apparatus of Fig. 1.
Figure 1:
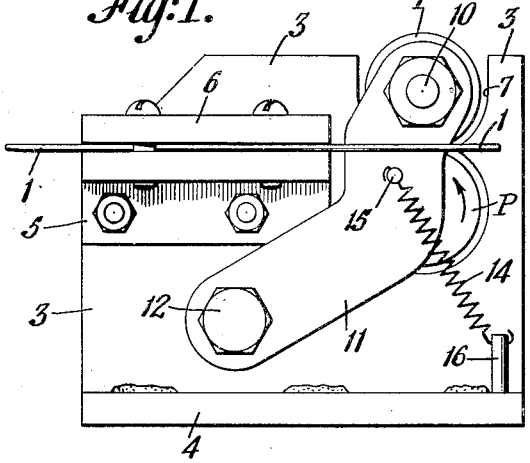
Figure 4:
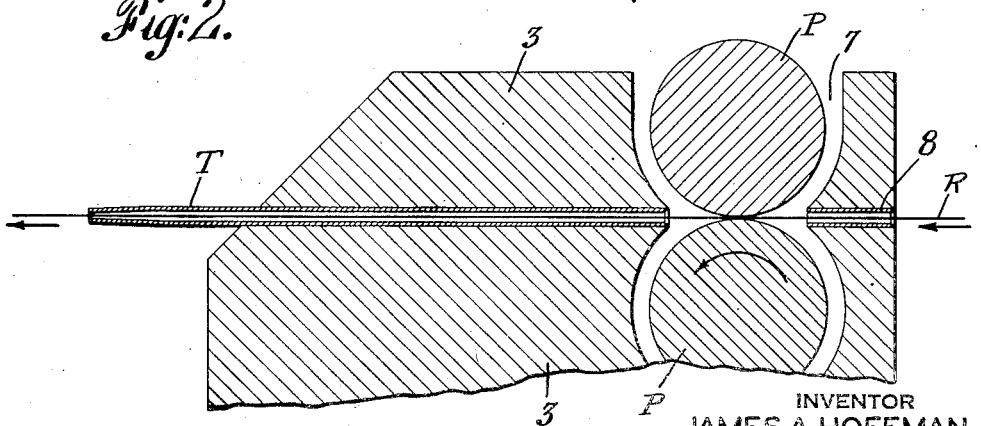
Fig. 4 is an enlarged partial vertical section, taken along line 4—4 of Fig. 3.

The heating flame F and air jet J impinge against the rod R at closely adjacent points, as in Fig. 5, and the air jet tends to bend the flame and rod adjacent the short heated length of rod, but at the same time grips the rod and pulls the same causing the desired attenuation or reduction in cross-sectional area. The heating flame F heats the rod quickly to the desired temperature and tends to follow along the rod and merge with the air stream. The heating flame and air jet are directed against the rod at about the same angle. Thus, the angle between heating tube 1 and rod tube T is about 15°, whereas the angle between air tube 2 and rod tube T is about 18°. However, other angles may be used, if desired.

As shown in Fig. 5 the air stream bends the flame along the work and becomes commingled or blended with it to a substantial extent. Those familiar with this art know that usually air or steam cools the rod and flame because the attenuating temperature of glass has been said to be around 2000° F. or above and the non-combustible gas stream cools on expanding. To do otherwise this air or steam would have to be heated not only to the attenuating temperature of the work but far above it so that after expanding and cooling further, the air or steam would not exert a cooling action on the work or flame. Such a non-cooling action is neither desired nor described. Since the maintenance of continuity in the glass is desired in forming a fiber, the reduced portion of the rod is kept from being overheated or discontinuous. The non-combustible gas stream is believed to control the flame temperature in the part of the flame overlapped by said stream. It will be apparent that the flame is bent only because the air velocity is greater than that of the flame. Fig. 5 illustrates how the flame may strike the work slightly in advance of the cooling air. When the work has a rate of movement of the value hereinafter mentioned it will be appreciated that such speed is in excess of that for conduction of heat through the work strip whereby the heated part of the rod is restricted from spreading rearwardly or in a direction against the work travel. The red heated part of the rod is no more than $\frac{3}{16}''$ in length. The precise reasons why only so short a length of rod is heated are not known. One reason may be that the heat is radiated since heat so radiated is said to vary more rapidly than directly with the temperature difference. Another reason may be that with a substantial reduction in diameter, on attenuation the surface of the rod exposed for cooling is greatly increased, its rate of travel is tremendously increased, and the path for heat conduction from the center to the surface of a fiber is reduced. Cooling the rod and the flame from the air stream may also be a factor. From Fig. 5 it may be seen the short heated length in advance of the main cooling stream is but a minor part of the length of the rod subtended by both the flame and stream in overlapping relation. Having each of the flame and air stream on only one side of the rod and opposite the other gives the desired results in the arrangement illustrated. The flame performs little or no pulling, at least as compared to what the higher velocity air stream does. Another possible explanation for the rod being heated to no greater length may be the probability that the air stream diverges, bending a substantial portion of the flame away from the work as the high velocity air stream expands in the expected manner. If the flame is bent away from the work to some extent then portions of the flame so moved out of contact with the rod are open and exposed for cooling and out of contact with the rod and no longer effectively heat it. Probably the leading end of the short rod portion, in the direction of work travel, is the hotter end. Although the rod is so small that it is not easy to see where attenuation occurs it seems reasonable to believe that such attenuation takes place at the leading or forward end of the restricted rod length.

A plurality of relatively fine fibers may be produced simultaneously by apparatus as illustrated in Figs. 6–9, which includes a heating flame outlet passage O for directing a relatively wide, ribbon-like heating flame against a plurality of rods R, and an air jet outlet passage Q for directing a relatively wide, ribbon-like air stream against the rods on the opposite side from the heating flame. The rods R are propelled through a plurality of relatively small, closely spaced, parallel grooves G by a pair of pushing rollers P', the rods R moving in substantially a single plane and the outlets O and Q each being inclined at an angle of about 15° with respect to the plane of grooves G and rods R. In addition, the apparatus of Figs. 6–9—the structural details of which will be described later—is so constructed that the ribbon-like heating flame and air stream each impinge against the rods along a generally horizontal line in the plane of the rods and at right angles to the direction of movement of the rods.

The rods R may be unwound from a spool or spools upon which they have been wound when made previously, or obtained in any other suitable manner, as directly from a mechanical drawing apparatus.

The rods R, as supplied to the apparatus of Figs. 1–5 or Figs. 6–9, preferably have a diameter of from 0.001 inch to 0.005 inch, and the glass fibers L may have an average diameter of as little as 0.00012 inch. When continuous rods are available, substantially continuous fibers of considerable length may be produced. Such fibers are particularly useful in making slivers, which are composed of several hundred fibers, a plurality of slivers being used in making a single thread. The thread may then be woven into glass cloth or used for other purposes. A decrease in fiber diameter to 0.00012 inch, from 0.00024 inch, previously used, provides a thread which has a much greater strength, particularly when subjected to sharp bends, as in knots. The need for this product may be appreciated from a statement in Slayter et al. 2,234,986, March 18, 1941, that flexibility is said to be "one of the important advantages" in making fibers for yarns and fabrics, and that "flexibility increases inversely as the cube of the diameter," (page 1, column 1, lines 36 to 38 and lines 40 to 41). Since the diameter has been at least substantially halved, flexibility of the product in industry should be much more than doubled. Also, the use of the method of this invention in producing fibers having diameters greater than 0.00012 inch is desirable, because of the economies involved.

In addition to the elements previously described, the apparatus of Figs. 1–4 includes a vertical supporting plate 3, tack welded or otherwise secured to a horizontal base 4. Heating tube 1, and also air tube 2, is clamped between an angle 5 and a plate 6, each angle and plate being held together in any suitable manner, such as by machine screws, as shown. Angles 5 may be bolted or otherwise suitably secured to vertical plate 3, on opposite sides thereof. As will be evident, the position of heating tube 1 or air tube 2 may easily be altered, and the heating tube and/or air tube clamped in any desired position along the top horizontal leg of one of angles 5.

A cut-away portion 7 of plate 3, which accommodates rollers P, divides the upper portion of plate 3 into front and rear sections; and rod tube T is secured in a horizontal hole, drilled through the front section of plate 3, on a level with the top of angles 5. Rod R is guided into engagement with rollers P and into tube T by a rear tube 8, which is secured in a suitable hole or aperture in the rear portion of plate 3, as in Fig. 4. Exact alignment of tube 8 with tube T is, of course, highly desirable.

Lower roller P is secured to or formed integrally with a shaft 9 which is supported by and driven by suitable means, such as a motor (not shown). Upper roller P is journalled on a shaft 10 which is secured to an arm 11 in any suitable manner, such as by one end of shaft 10 being threaded and bolted to arm 11, as shown. Arm 11 is pivoted on a bolt 12 which threadedly engages a lug 13, which is welded or secured in any other suitable manner to the side of plate 3 beneath angle 5. The upper roller is held against the glass rod and the lower roller by a spring 14, one end of which is attached to a pin 15 secured to arm 11. The other end of spring 14 is attached to a pin 16 secured to base 4.

The apparatus of Figs. 6–9 is similar in certain respects to the apparatus of Figs. 1–5, with sufficient consideration, of course, given to the fact that the heating flame and air jet of Figs. 1–5 are discharged at the sides of rod R, while the heating flame of the apparatus of Figs. 6–9 is discharged above, and the air jet below, the glass rods. Thus, the apparatus of Figs. 6–9 includes a lower block or supporting structure 18, secured to a base 19 and provided with an overhanging forwardly extending lip, as shown. Secured to the underside of the overhanging lip of block 18—which underside is inclined at an angle of substantially 15° with respect to the top surface of the block—are a plate 20 and a cap 21 with a U-shaped gasket 22 clamped therebetween, as set forth in U. S. Patent No. 2,193,100. The slot in gasket 22 forms the air jet outlet passage Q, and compressed air is supplied to the outlet passage Q through a tube 23, which is connected to a suitable source of supply thereof.

The outlet passage O for discharging a combustible mixture which forms the heating flame is similarly formed between an upper block 24 and a cap 25, by the slot in a U-shaped gasket 26 clamped between block 24 and cap 25. A combustible mixture of gases, such as oxygen and fuel gas, is supplied outlet O through a tube 27. The upper surface of block 24 is inclined at an angle of substantially 15° with respect to the lower surface thereof, so that the outlet passage O is inclined at the same angle to the plane of the rods. Suitable guiding passages for the rods may be formed by a plurality of closely spaced, parallel grooves G milled in the upper surface of lower block 18, and closed by the smooth lower surface of upper block 24.

The upper end of plate 20 extends forwardly beyond the ends of blocks 18 and 24, to minimize possible interference by the air jet with the heating flame, but such extension of plate 20 may be found in some cases to be unnecessary. The distance between the end of outlet passage Q and the point at which the air jet strikes the rods R may be altered by substituting, for plate 20, a suitable plate having the desired thickness, or inserting a suitable shim beneath plate 20; and, similarly, the distance between the end of discharge passage O and the point at which the heating flame strikes the rods may be varied by placing a suitable shim or plate beneath gasket 26. In addition, a tapered shim or plate may be placed beneath plate 20 or gasket 22, or beneath gasket 26, to alter the angle between heating passage O and/or air jet passage Q and the plane of the rods. It will be apparent to those skilled in the art that other changes in the size and position of outlets O and Q are readily made.

The rear portions of grooves G are covered by a cap 28, suitable holes being formed in block 18 and cap 28 to accommodate rollers P', as shown. The rear ends of grooves G are enlarged in a suitable manner, as through beveled edges 29 on cap 28 and block 18, to permit the rods to be guided more easily into the grooves.

Lower roller P' is mounted on, or formed integrally with, a shaft 30 which is driven by a motor M, and the outboard end of shaft 30 is held accurately in position by a centering screw 31. Screw 31 is adjustable with respect to, and also lockable in position on, a bracket 32, which in turn is secured to lower block 18. The upper roller P' is mounted on, or formed integrally with, a shaft 33, the ends of which engage slots formed in a pair of arms 34. (Only one arm 34 is shown, but it will be understood that the apparatus is provided with a similar arm 34 on the opposite sides of blocks 24 and 28.) Each arm 34 is pivoted on a stud 35 attached to block 24, and the upper roller is held against the lower roller by a spring 36, one end of which is attached to the outer end of one arm 34 and the opposite end of which is attached to an ear 37 formed on lower block 18.

The preferred operation of the apparatus of Figs. 1–5 and the apparatus of Figs. 6–9 is essentially similar, comprising the steps of starting the flow of the combustible mixture of gases and igniting the heating flame; adjusting the flame; turning on the flow of compressed air and adjusting the air jet; feeding one or more rods between rollers P or P'; and adjusting the speed of the rod or rods to a desired rate so that the high velocity air jet will pull and stretch or attenuate each rod the desired amount. It will be understood that the above sequence of operations may be altered, as desired. Also, although only the lower rollers P or P' are mechanically driven, it will be understood that the upper rollers P or P' may be mechanically driven, if desired.

Considerable success has been achieved in operations with the above apparatus when the heating flame was formed by a slightly oxidizing oxyfuel gas mixture, the end of the inner cone of the heating flame being spaced slightly from the point of intersection with the rods, with approximately $\tfrac{1}{16}$ inch of each rod, longitudinally thereof, being at a red heat. In making the glass fiber, a saving in compressed air consumption, estimated at approximately 95%, as compared with the best previous commercial operations, was effected. Since the cost of air is a substantial portion of the production cost in such previous operations, such economies in air consumption are material.

Instead of producing glass fibers, by proper alteration in the size and/or speed of traverse of the rod, droplets or beads of glass may be formed. For instance, during use of the apparatus of Figs. 6–9, relatively fine glass fibers were produced at a glass rod speed of approximately 40 ft./min. and an air pressure of between 75 and 90 lbs./sq. in. When the rod speed was reduced to a value of between 5 and 20 ft./min., countless small spherical beads, apparently substantially perfectly formed, were produced. In addition to the decrease in rod speed, a change in the volume of heating gases and/or a drop in the pressure of air supplied to the air jet, was found to assist in causing the glass beads to be produced, instead of the relatively fine glass fibers.

What is claimed is:

1. The method of treating a preformed vitreous rod in preparation for attenuation which comprises heating the rod to an attenuating temperature by directing a flame thereon from only one side, cooling the flame and rod by directing a stream of non-combustible gas thereon along an axis at an acute angle to the rod, from only one side, substantially opposite the flame, and at a higher velocity than the flame, the rod being heated to said attenuating temperature throughout only a short distance in advance of the main body of the stream impinging the rod, the portions of the rod subtended by the flame and stream overlapping to a large extent to lessen the danger of the rod becoming discontinuous, and longitudinally moving the rod relative to the flame in the general direction of the stream and flame at a rate to insure continuity of the rod.

2. The method of treating a preformed vitreous rod such as glass in preparation for attenuation which comprises heating the rod to an attenuating temperature by directing a flame thereon from only one side and at an acute angle to the rod, cooling the flame and rod by directing a stream of non-combustible gas thereon along an axis at an acute angle to the rod from only one side and substantially opposite the flame, the rod being heated to said temperature throughout only a short distance and in advance of part of the rod impinged by flame and stream axes, the rod portions subtended by the flame and stream overlapping to a substantial extent to lessen danger of the rod becoming discontinuous, and longitudinally moving the rod relative to the flame in the general direction of the stream and flame at a rate to insure continuity of the rod.

3. The method of treating a preformed glass rod in preparation for attenuation which comprises heating the rod to an attenuating temperature by directing a flame thereon from a side, cooling the flame and rod to restrict the length of the heated portion near the main body of the flame by directing a stream of non-combustible cooling gas along the rod at an acuate angle thereto, substantially opposite the flame, and at a velocity greater than that of the flame, the rod portions subtended by the flame and stream overlapping to a substantial extent to lessen danger of the rod becoming discontinuous, the heated portion of the rod being in advance of the major part of said overlapping portions and being only a minor part of the length of the rod subtended by the flame and stream in overlapping relation, and relatively longitudinally moving the rod with respect to the flame in the general direction of the flame and stream at a rate to insure continuity of the rod.

4. The method of treating a preformed glass rod which comprises heating a short length of said rod to an attenuating temperature by directing a flame onto the rod from only one side at an acute angle to the rod, cooling the flame and rod by directing a stream of cooling gas onto the rod at an acute angle from only one side substantially opposite the flame, and at a higher velocity than the flame, portions of the rod subtended by the flame and stream overlapping to reduce the danger of the rod becoming discontinuous, relatively moving the rod longitudinally with respect to the flame in the general direction of the flame and stream at a rate to insure its continuity, the velocity of said stream exerting a pull on the heated portions of the rod, and attenuating the heated portion of the rod by the pull thereon due at least substantially to said stream.

5. The method of heating and attenuating a preformed rod of vitreous material such as glass which comprises heating a short length of rod to an attenuating temperature by directing a flame thereon from a side, cooling the flame and rod by directing a stream of non-combustible cooling gas thereon from a side substantially opposite the flame, at an acute angle to the rod, and at a velocity greater than the flame, substantial portions of the rod subtended by the flame and stream overlapping to insure continuity of the rod, the heated portion of the rod being in advance of the main overlapping portions and being a minor part of the length of such overlapping portions, longitudinally moving the rod relative to said flame, in the general direction of the flame and stream at a rate to insure its continuity, and attenuating the heated portion of the rod with the aid of the pull on the rod due to the stream moving along said rod at a high velocity.

6. The method of heating and attenuating a preformed rod of vitreous material such as glass which comprises heating a short length of rod to an attenuating temperature by directing a flame thereon from a side, cooling the flame and rod by directing a stream of non-combustible cooling gas thereon from a side substantially opposite the flame, at an acute angle to the rod, and at a velocity greater than the flame, substantial portions of the rod subtended by the flame and stream ovelapping to insure continuity of the rod, the heated portion of the rod being in advance of the main overlapping portions and being a minor part of the length of such overlapping portions, longitudinally moving the rod relative to said flame, in the general direction of the flame and stream at a rate to insure its continuity, attenuating the heated portion of the rod due to said stream moving along the attenuated rod at a high velocity, and guiding said rod to adjacent its heated portion, the longitudinal movement of the rod to said flame being one of pushing said rod before reaching its heated portion.

7. The method of heating and attenuating a vitreous rod such as glass without excessive heating and resulting frequent discontinuity which comprises heating a short length to an attenuating temperature by directing a flame onto the rod from one side at an acute angle to the rod, relatively longitudinally moving the rod with respect to and in a general direction of the flame at a rate to insure continuity in the rod, restricting the heated length of the rod and cooling the flame and rod by directing a stream of non-combustible gas along the rod in the direction of its movement from a side generally opposite the flame at a higher velocity than the flame and at an acute angle to the flame whereby the most highly heated portion of the rod is just before the main body portion of the stream impinges the rod and deflects the flame and rod along said stream cooling the rod, the heated portion of the rod being a minor part of the rod length subtended by the flame, and attenuating said heated portion of the rod by the application of tension on the attenuated portion of the rod due to the velocity of the cooling gas moving along the rod.

8. The method of heating and attenuating simultaneously a plurality of preformed glass rods arranged side by side simulating a ribbon which comprises heating said rods by directing a ribbon-like flame thereon at an acute angle from a side to simultaneously heat the rods, feeding the rods to the flame at a rate to preserve their continuity, guiding the rods to adjacent the flame impingement thereon whereby close lateral spacing of the rods is possible, restricting the heated length of rods in the direction of their travel by directing a ribbon-like stream of cooling gas at a velocity above that of the flame across said rods and substantially opposite the flame at an acute angle to each rod whereby the space between the rods enables the cooling stream to pass between the rods, to cool and deflect the flame and the rods, the rod lengths subtended by the flame being overlapped by said stream for a substantial depth longitudinally of the rods, and applying tension to the reduced portions of the rods and attenuating the heated portions by the cooling stream moving along the rods at its high velocity.

9. An apparatus for treating a preformed rod of vitreous material such as glass comprising means for heating the rod to at least an attenuating temperature including a flame nozzle directed from only one side onto the rod at an acute angle to the rod, means for pushing the rod longitudinally to said flame, and means for cooling the flame including a gaseous cooling stream nozzle directed onto the rod from only one side, at an acute angle to the rod and to an axis of the flame nozzle, substantially opposite the flame nozzle, and directed to have its issuing stream impinge a major portion of the rod length subtended by the flame with the stream moving in the general direction of longitudinal travel of the rod.

10. An apparatus for heating and attenuating a preformed rod of vitreous material such as glass comprising means for heating the rod to an attenuating temperature including a flame nozzle directed onto the rod from only one side at an acute angle to the rod, means for feeding the rod longitudinally to said flame at a rate to insure continuity in the rod, means for cooling the flame and rod including a gaseous cooling stream nozzle directed onto the rod from only one side, at an acute angle to the rod, substantially opposite the flame nozzle and directed to have its issuing stream impinge a major portion of the rod length subtended by the flame to cool the flame and rod and restrict the heated portion of the rod to a short length in advance of the impingement of the cooling stream, and means connecting the cooling stream nozzle to a gaseous pressure source at a pressure for the cooling stream issuing from its nozzle to possess a higher velocity than the flame whereby the stream from said second nozzle may deflect the flame along the rod and is adapted to apply tension to the rod for attenuating the heated portion thereof, the longitudinal movement of the rod being in the general direction of the cooling stream.

11. An apparatus for treating a plurality of preformed vitreous rods which comprises means for simultaneously heating a plurality of such rods to an attenuating temperature including a laterally elongated flame nozzle wide enough to direct a flame spanning the rods transversely thereof and of their direction of travel at an acute angle to the general plane of the rods, means for pushing the rods longitudinally to the flame, guide means for the rods between said flame and rod pushing means whereby said rods may be arranged close together yet spaced apart to allow flame gases to pass therebetween, means for cooling the rods after being heated by said flame, said cooling means including a gaseous cooling stream nozzle directed onto the rods from a side opposite said flame, at an acute angle to the rods and axis of the flame nozzle to have its issuing stream impinge a major portion of the rods longitudinally subtended by the flame with the stream moving in the general direction of longitudinal travel of the rods to restrict the heated portions of the rods to short lengths in advance of the impingement of the main body of the cooling stream, and means connecting the cooling stream nozzle to a source of gas under pressure for the cooling stream to possess a velocity whereby said cooling stream may deflect the flame along the rods and pass between the rods, the rod pushing means operating at a speed to insure continuity to the rods.

JAMES A. HOFFMAN.